United States Patent [19]

Alberico et al.

[11] Patent Number: 4,819,687

[45] Date of Patent: Apr. 11, 1989

[54] VALVE BOX STABILIZER

[76] Inventors: Joseph S. Alberico, 508 Peale St., Joliet, Ill. 60433; Carmine Corsetti, 3209 Jeffrey Dr., Joliet; Fiore Brandolino, 1713 Highland Ave., Crest Hill, both of Ill. 60435

[21] Appl. No.: 126,732

[22] Filed: Nov. 30, 1987

[51] Int. Cl.⁴ .............................................. F16L 5/00
[52] U.S. Cl. ...................................... 137/367; 403/6; 403/287
[58] Field of Search .............. 137/365, 367, 370, 368, 137/364; 403/6, 10, 17, 287

[56] References Cited

U.S. PATENT DOCUMENTS

| 347,567 | 9/1886 | Clarke | 137/370 X |
|---|---|---|---|
| 536,268 | 3/1895 | Cullen | 137/365 |
| 589,357 | 8/1897 | Link | 137/365 X |
| 604,622 | 5/1898 | Lobdell | 137/365 |
| 996,956 | 7/1911 | Walcott | 137/370 X |
| 3,548,864 | 12/1970 | Handley et al. | |
| 4,030,519 | 6/1907 | Zinn | |
| 4,308,886 | 1/1982 | Handley et al. | |
| 4,534,378 | 8/1985 | Gagas et al. | 137/367 |
| 4,556,081 | 12/1985 | Gagas | 137/364 X |

Primary Examiner—Stephen Hepperle
Attorney, Agent, or Firm—Lalos & Keegan

[57] ABSTRACT

A valve box stabilizer for stabilizing a valve box covering an underground valve housing including a body for receiving the neck of the valve, an inner wall portion for contacting this neck along a substantial portion of the valve, and the wall portion having a plurality of fins each with an outer surface to form a discontinuous outer wall for contact with the internal surface of the valve box so as to prevent movement of the valve box relative to the valve.

15 Claims, 2 Drawing Sheets

FIG. 1A. (PRIOR ART)
FIG. 3.
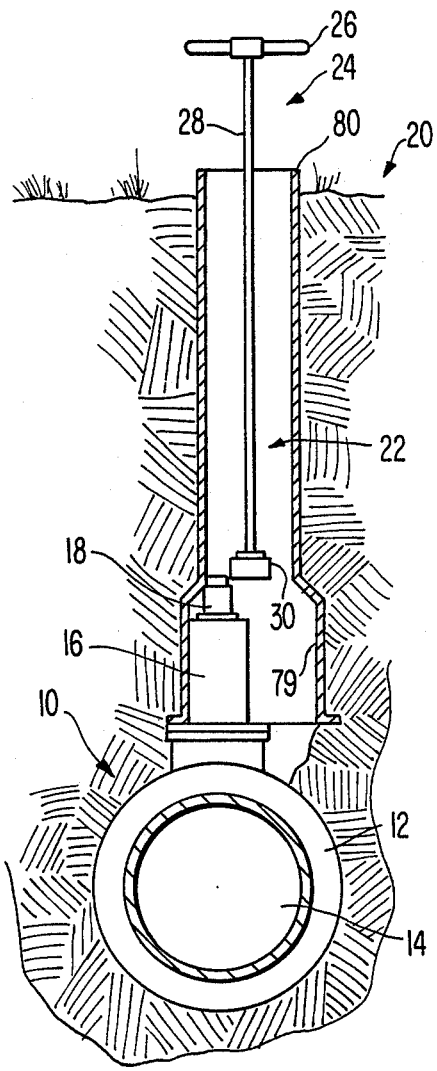
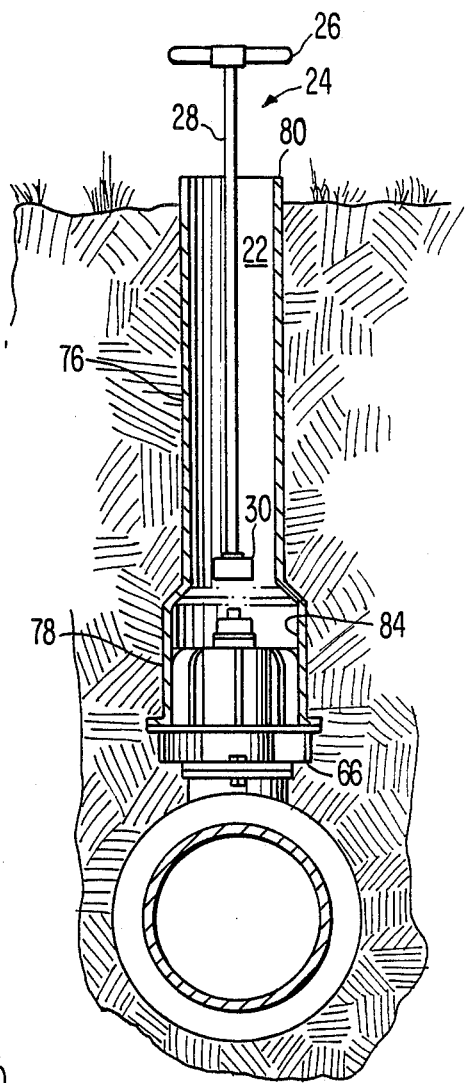
FIG. 1B. (PRIOR ART)
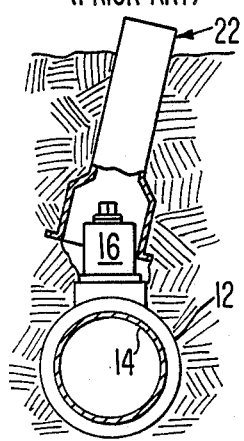
FIG. 2.
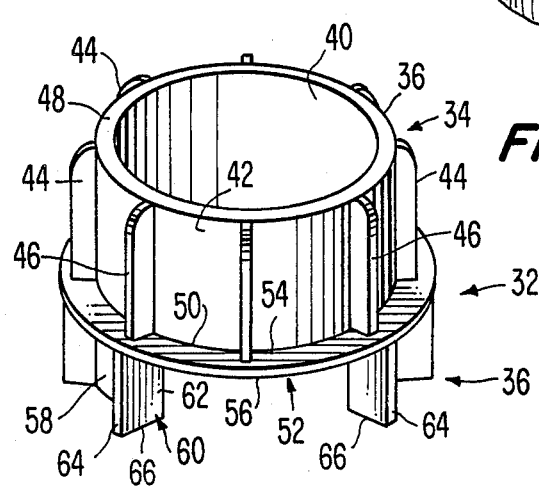

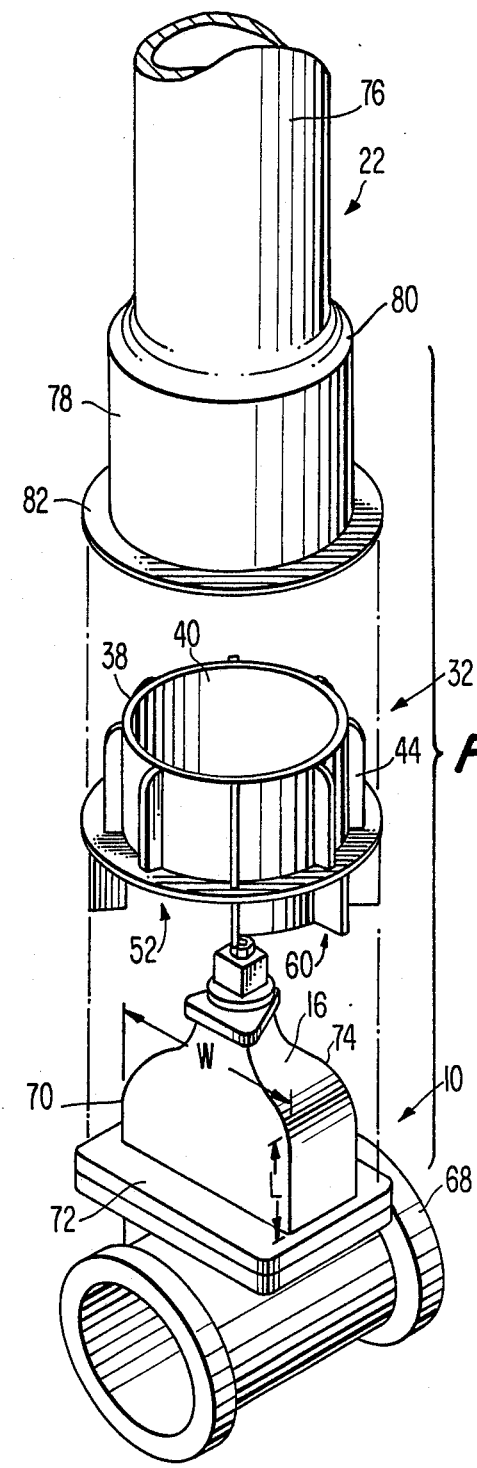
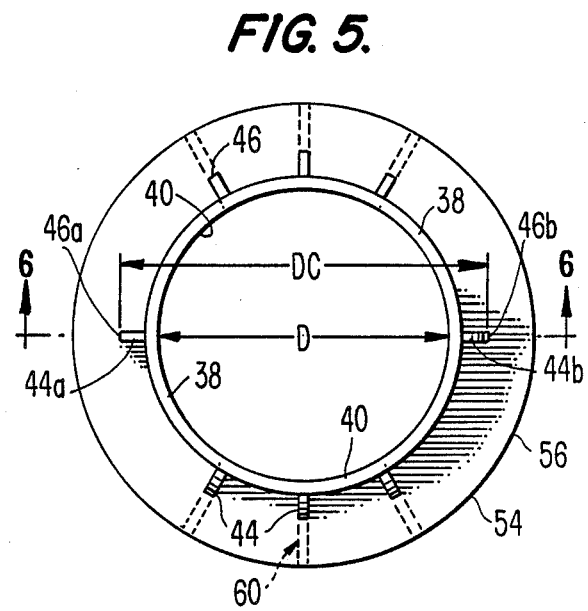
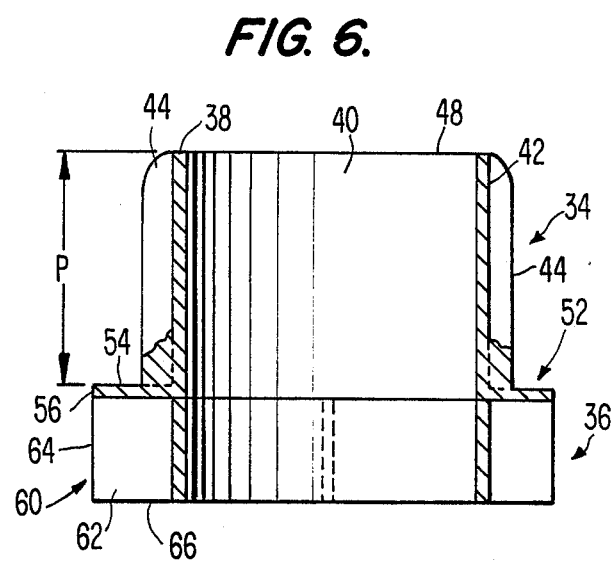

4,819,687

VALVE BOX STABILIZER

FIELD OF INVENTION

This invention relates to underground utilities service lines such as gas distribution systems and water mains. Typically, shut-off valves are placed in these distribution lines so that, in case of an emergency, water or gas distribution can be cut off at critical points along the line. In order to provide access to this underground valve, a valve box is placed onto the valve housing prior to filling in the area in which the distribution line and associated valve are installed. The valve box extends from the valve housing to the upper ground surface thereby providing access to the buried valve. The valve can then be operated by means of a valve wrench with an elongated handle that extends through the length of the valve box. The wrench includes an engaging member at its lower end for opening or closing the valve.

BACKGROUND OF THE INVENTION

The utility distribution line and associated valve are normally installed in an excavated trench. With the valve box placed over the valve, the excavated trench is then backfilled and graded. It is during this backfilling and grading operation that the valve box is often knocked out of proper alignment with the valve making it difficult, if not impossible, to gain access to the valve from the upper ground surface. In some cases the valve box must be excavated to regain access to the valve. This procedure is expensive and in some cases may present a danger to the public if immediate access to the shut-off valve is critical. In an effort to resist the lateral forces placed on the valve box during the backfilling procedure several arrangements have been devised to support the valve box and to center its position relative to the valve. Examples of such prior art devices are shown in U.S. Pat. Nos. 3,548,864, 4,534,378 and 4,556,081.

In U.S. Pat. No. 4,534,378 the bottom portion of the valve box is received within U-shaped arms extending from a ring mounted on the valve housing. The U-shaped rings provide vertical support and center the valve box on the valve housing. However, during a backfilling operation, the valve box can be knocked off the U-shaped arms since the arms provide only minimal resistance to lateral forces acting upon the valve box.

U.S. Pat. No. 4,556,081 provides another support structure in which vertical guides position the valve box in relation to the valve. However, once again these guides are inadequate in preventing the valve box from being displaced or misaligned.

U.S. Pat. No. 3,548,864 provides a centering means in the form of a conduit guide through the body of the valve box. If, however, lateral force is applied against the valve box it will rotate about the conduit and tip in relation to the valve housing.

Other prior art arrangements have suggested apparatus for attaching the valve box to the valve housing. For example, U.S. Pat. No. 996,956 suggests a clamp arrangement that attaches to the valve housing and extends vertically into the body of the valve box. The clamp provides only a minimum contact area with the interior of the valve box housing. This minimum contact area can act as a pivot point allowing the valve box to tilt in relation to the clamp in the valve.

U.S. Pat. No. 4,030,519 suggests the use of plastic resilient fingers extending from the valve box and clamping on the conduit leading into the valve. With this arrangement the valve box can rotate about the conduit and thus be vertically misaligned with the valve housing.

U.S. Pat. No. 4,308,886 suggests a valve box arrangement with valve engaging projections which are forced into frictional engagement with the valve side when the valve box is placed on the valve. The frictional engagement of the projections provides insufficient resistance to the lateral forces experienced by the valve box during the backfilling operation. Further, such an arrangement requires that the valve box be specially constructed for each type of valve encountered in order that the projections encounter and frictionally engage the valve housing.

OBJECTS OF THE INVENTION

It is therefore an object of the present invention to provide a valve box stabilizer for aligning a valve box on a valve housing and for maintaining such alignment.

It is another object of the present invention to provide a valve box stabilizer with sufficient resistance to the lateral forces experienced by a valve box during a backfilling operation.

It is a further object of the present invention to provide an apparatus which can be used with a variety of valve boxes and a variety of valves to adapt one to the other while providing the centering and support functions necessary during a backfilling operation.

Other objects and advantages of the present invention will be apparent from the following detailed description and accompanying drawings.

BRIEF DESCRIPTION OF THE DRAWINGS

FIG. 1A is an elevational view of a prior art arrangement showing lateral misalignment of the valve box.

FIG. 1B is an elevational view of a prior art arrangement showing both lateral and vertical misalignment of the valve box.

FIG. 2 is a perspective view of the valve box stabilizer of the present invention.

FIG. 3 is an elevational view showing the valve box stabilizer positioned on the valve housing and in the valve box.

FIG. 4 is an exploded perspective view showing the relationship of the valve box stabilizer, the valve box, and the valve housing.

FIG. 5 is a top plan view of the valve box stabilizer.

FIG. 6 is a sectional view of FIG. 5 through the line 6—6.

DETAILED DESCRIPTION

FIGS. 1A and 1B illustrate the problems encountered in prior art arrangements. The valve housing 10 includes a valve body 12 to which piping or conduits (not shown) are attached at valve body opening 14. The valve housing 10 includes a neck portion 16 extending vertically from valve body 12. An internal valve member (not shown) is actuated by turning a valve nut 18. Access to valve nut 18 through ground material 20 is provided by hollow valve box 22. Valve wrench 24 with T-member 26, elongated handle 28 and hexagonal wrench portion 30 is used to turn valve nut 18 to open or close the internal valve member.

As seen in FIG. 1A valve box 22 can become laterally displaced by ground material 20 during a backfilling operation. In this situation, it becomes difficult, if not impossible, to manipulate valve nut 18 with valve wrench 24. Axial alignment of hexagonal wrench portion 30 with valve nut 18 cannot be achieved with valve box 22 displaced as shown in FIG. 1A. FIG. 1B illustrates a similar problem when valve box 22 is tilted as a result of lateral force experienced by valve box 22 from ground material 20. With valve box 22 raised from the body of the valve and tilted at an angle as shown in FIG. 1B, valve wrench 24 cannot be used properly to align hexagonal wrench portion 30 on valve nut 18 to turn valve nut 18. Valve box 20 must be excavated to gain access to valve nut 18 to close or open the internal valve member. This can be a time-consuming and expensive procedure and may present a public health hazard if immediate access to the shut-off valve is critical.

The valve box stabilizer 32 of the present invention is illustrated in FIGS. 2 through 6. Stabilizer 32 can be constructed of any suitable material, for example, molded plastic, which offers high resistance to impact, is corrosive-proof and resilient. Valve box stabilizer 32 comprises two major sections, an upper stabilizer section 34 and a lower support section 36. Stabilizer section 34 is formed of cylindrical portion 38 with an inner cylinder surface 40. Extending from outer cylinder surface 42 of cylinder portion 38 are a plurality of radial fins 44. The outside vertical surface 46 of each fin 44 together form a partial second outer cylinder surface.

As an alternative to radial fins 44, the wall 48 of cylinder portion 38 could be enlarged to have a thickness dimension extending between inner cylinder surface 40 and the partial second outer cylinder surface formed by the outside vertical surfaces 46 of radial fins 44. Fins 44 reduce the material that would be necessary to form a cylindrical collar having the desired wall thickness dimension. The desired wall thickness dimension being the distance between inner cylinder surface 40 and the partial second outer cylinder surface formed together by vertical surfaces 46.

Extending from lower end 50 of wall 48 is radial platform 52. Radial platform 52 comprises a support surface 54 terminating in side wall 56. Extending vertically beneath radial platform 52 is lower cylinder wall 58. Radial support legs 60 extend radially from lower cylinder wall 58 and are provided with side surfaces 62, outside vertical surfaces 64 and bottom surface 66.

As illustrated in FIGS. 3 and 4, valve box stabilizer 32 is placed over neck portion 16 of valve housing 10. The inner diameter D of cylinder portion 38 (as illustrated in FIG. 5) is chosen to be just greater than width dimension W of neck portion 16 as shown in FIG. 4. Width dimension W is the distance between straight outer neck surface 68 and straight outer neck surface 70 of neck portion 16. Straight outer neck surface 68 terminates on its lower end at valve housing platform 72 and on its upper end at shoulder 74. Straight outer neck surface 70 is similarly formed. The height H of radial fins 44, as shown in FIG. 6, is chosen to be at least as great as the length L of straight outer neck surface 68, as shown in FIG. 4. The diameter D dimension of cylinder portion 38 is chosen such that cylinder portion 38 fits over valve neck portion 16 with a minimal clearance existing between inner cylinder surface 40 and straight outer neck surfaces 68 and 70. The height dimension H of radial fins 44 is chosen to provide a maximum contact area with straight outer neck surfaces 68 and 70 when valve box stabilizer 32 is placed over valve neck portion 16 and onto valve housing platform 72.

Referring to FIGS. 3 and 4, valve box 22 consists of an upper cylindrical tubular portion 76 and a lower cylindrical tubular portion 78 having internal surface 79 connected by a radially extending shoulder 80. Lower cylindrical tubular portion 78 connects at its lower end to valve box platform 82.

The distance DO as shown in FIG. 5, between the outside vertical surfaces 46a and 46b of radial fins 44a and 44b, respectively, is chosen to be just less than the inner diameter of internal surface 79 of lower cylindrical tubular portion 78 of valve box 22 to provide approximate contact therebetween. The height H of radial fins 44, as shown in FIG. 6, is chosen such that outside vertical surfaces 46 of radial fins 44 will contact the inner surface 84 (FIG. 3) of lower cylindrical tubular portion 78 along a substantial vertical length of lower cylindrical tubular portion 78 as shown in FIG. 3.

Valve box stabilizer 32 of the present invention, as shown and described, eliminates the significant inherent radial clearance that normally exists in the prior art between the outer dimensions of valve neck portion 16 and the internal surface 79 of lower cylindrical tubular portion 78. It is this prior radial clearance that permits lateral movement of valve box 22 in relation to valve neck portion 16 as shown in prior art FIGS. 1A and 1B. Utilizing the present invention, the space between neck portion 16 and lower cylindrical tubular portion 78 is now occupied by the valve box stabilizer 32. Valve box 22 is supported and stabilized by radial fins 44 along a substantial vertical distance upwardly from valve box platform 82. Lateral forces experienced by valve box 22 during a backfilling operation are effectively resisted by valve box stabilizer 32 in contact with both the valve neck portion 16 and the lower cylindrical tubular portion 78. Outside vertical surfaces 46 of radial fins 44 in contact with inner surface 84 of lower cylindrical tubular portion 78 along a substantial vertical distance inhibits valve box 22 from pivoting about any one point of contact. The prior art problem of pivoting or tilting is illustrated in FIG. 1B. Valve box stabilizer 32 with an inner surface in contact with valve neck portion 16 along a substantial vertical length and an outer surface in contact with the lower cylindrical tubular portion 78 of the valve box 22 effectively prevent any radial or angular movement about the vertical axis of valve housing 10, thus preventing displacement of the valve box 22 during a backfilling operation.

In addition to stabilizing valve box 22, valve box stabilizer 32 also supports valve box 22. With valve box 22, stabilizer 32, and valve housing 10 in position as shown in FIG. 3, valve box 22 rests upon valve box stabilizer 32 with valve box platform 84 seated on support surface 54 of radial platform 52. Radial support legs 60 of stabilizer 32 rest upon valve housing platform 72. Radial support legs 60 add strength to stabilizer 32 and help to distribute localized stresses imposed upon valve housing 10 when upper surface 86 of valve box 22 is exposed to the roadway and receives heavy pressures from passing vehicles.

In view of the foregoing description, it is believed that the objects of the invention have been attained and that the invention should be limited solely and exclusively in scope by the following claims in which,

We claim:

1. A valve box stabilizer for stabilizing a valve box covering an underground valve housing having a valve body and a valve neck extending vertically from said valve body, and wherein the valve box includes a tubular lower end for receiving the valve neck, said valve box stabilizer comprising,
- a hollow body for receiving said valve neck and for being received within said valve box lower end,
- said stabilizer having a wall portion with an inner surface for contact with at least a portion of said valve neck along a substantial vertical length of said valve neck,
- said wall portion also having at least one rigid outer surface fitting within said valve box lower end and contacting a portion of said lower end along a substantial vertical length of said valve box lower end,
- said outer surface extending radially outwardly from said inner surface a distance sufficient to contact said valve box along said substantial vertical length of said valve box lower end with at least two diametrically opposed points on a circumference of said outer surface contacting said valve box simultaneously.

2. A valve box stabilizer according to claim 1 wherein,
- said wall portion includes a plurality of radial fins,
- each of said fins includes a vertical outer surface,
- said fin outer vertical surfaces together forming a discontinous wall portion outer surface.

3. A valve box stabilizer defined in claim 1 including,
- means for supporting said valve box stabilizer on said valve housing.

4. The valve box stabilizer of claim 1 including,
- said wall portion comprising a plurality of radial fins for contact with said valve box, and
- means for supporting said valve box stabilizer on said valve housing.

5. The valve box stabilizer of claim 1 wherein,
- said wall portion includes a plurality of radial fins,
- each of said fins includes a vertical outer surface,
- said fin outer vertical surfaces together forming a discontinuous wall portion outer surface, and
- a radial platform extending from the lower end of said wall portion.

6. A valve box stabilizer for stabilizing a valve box covering an underground valve housing having a valve body and a valve neck extending vertically from said valve body, and wherein the valve box includes a tubular lower end for receiving the valve neck, said valve box stabilizer comprising,
- a hollow body for receiving said valve neck and for being recieved within said valve box lower end
- said stabilizer having a wall portion with an inner surface for contact with at least a portion of said valve neck along a substantial vertical length of said valve neck,
- said wall portion also having at least one outer surface fitting within said valve box lower end and contacting a portion of said lower end along a substantial vertical length of said valve box lower end, and
- said wall portion comprising a plurality of radial fins for simultaneous contact with said valve box.

7. A valve box stabilizer according to claim 1 or claim 6 including,
- a radial platform extending from the lower end of said wall portion.

8. A valve box stabilizer defined in claim 1 or claim 6 including,
- leg means secured to said wall portion and extending radially outwardly from said wall portion a distance greater than that of said outer surface.

9. The valve box stabilizer of claim 8 wherein,
- said leg means includes a plurality of radially extending legs.

10. The valve box stabilizer of claim 8 wherein,
- said outer surface including a plurality of radially outwardly extending fins forms a discontinuous surface.

11. The valve box stabilizer of claim 8 wherein,
- said leg means includes a plurality of radially extending legs, and
- said outer surface including a plurality of radially outwardly extending fins forms a discontinuous surface.

12. The valve box stabilizer of claim 1 or claim 6 including,
- leg means secured to said wall portion and extending radially outwardly from said wall portion a distance greater than that of said outer surface, and
- a radially extending platform surrounding said wall portion and positioned between said leg means and said outer surface.

13. A valve box stabilizer according to claim 6 wherein,
- each of said fins includes a vertical outer surface, and
- said fin outer vertical surfaces together form a discontinuous wall portion outer surface.

14. The valve box stabilizer of claim 6 including,
- means for supporting said valve box stabilizer on said valve housing.

15. The valve box stabilizer of claim 6 wherein,
- each of said fins includes a vertical outer surface,
- said fin outer vertical surfaces together forming a discontinuous wall portion outer surface, and
- a radial platform extending from the lower end of said wall portion.

* * * * *

REEXAMINATION CERTIFICATE (3687th)

United States Patent [19]

Alberico et al.

[11] B1 4,819,687

[45] Certificate Issued Dec. 15, 1998

[54] VALVE BOX STABILIZER

[76] Inventors: Joseph S. Alberico, 508 Peale St., Joliet, Ill. 60433; Carmine Corsetti, 3209 Jeffrey Dr., Joliet; Fiore Brandolino, 1713 Highland Ave., Crest Hill, both of Ill. 60435

Reexamination Request:
No. 90/004,663, Jun. 9, 1997

Reexamination Certificate for:
Patent No.: 4,819,687
Issued: Apr. 11, 1989
Appl. No.: 126,732
Filed: Nov. 30, 1987

[51] Int. Cl.⁶ .................................................. F16L 5/00
[52] U.S. Cl. .............................. 137/367; 403/6; 403/287
[58] Field of Search ............................. 137/367, 365, 137/370, 368, 364; 403/6, 10, 17, 287

[56] References Cited

U.S. PATENT DOCUMENTS

| 349,567 | 9/1886 | Clarke | 137/367 |
|---|---|---|---|
| 2,099,479 | 11/1937 | Heinkel et al. | 137/367 |
| 4,534,378 | 8/1985 | Gagas et al. | 137/367 |
| 4,556,081 | 12/1985 | Gagas | 137/366 |

*Primary Examiner*—Stephen M. Hepperle

[57] ABSTRACT

A valve box stabilizer for stabilizing a valve box covering an underground valve housing including a body for receiving the neck of the valve, an inner wall portion for contacting this neck along a substantial portion of the valve, and the wall portion having a plurality of fins each with an outer surface to form a discontinuous outer wall for contact with the internal surface of the valve box so as to prevent movement of the valve box relative to the valve.

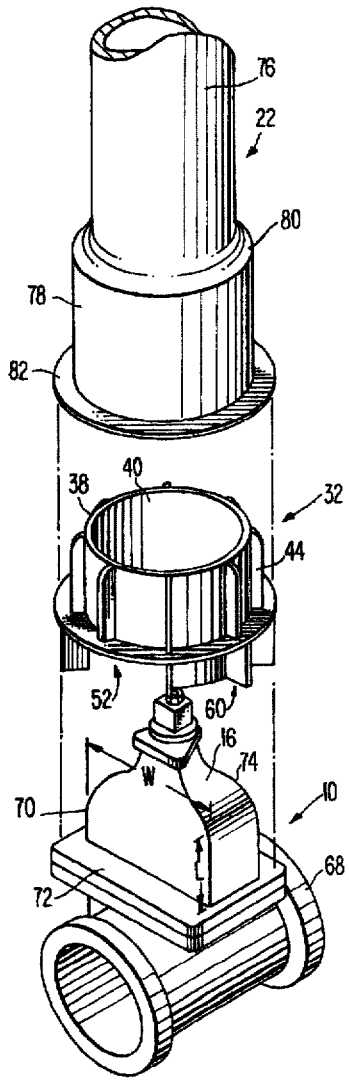

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7–15, dependent on an amended claim, are determined to be patentable.

1. A valve box stabilizer for stabilizing a valve box covering an underground valve housing having a valve body and a valve neck extending vertically from said valve body, and wherein the valve box includes a *radially expanded* tubular lower end for receiving the valve neck, said valve box stabilizer comprising:

a hollow body for receiving said valve neck and for being received within said *radially expanded* valve box lower end, said stabilizer having a wall portion with an inner surface for contact with at least a portion of said valve neck along a substantial vertical length of said valve neck, said wall portion also having at least one rigid outer surface fitting within said *radially expanded* valve box lower end and contacting a portion of said *radially expanded valve box* lower end along a substantial vertical length of said *radially expanded* valve box lower end, said outer surface extending radially outwardly from said inner surface a distance sufficient to contact said valve box along said substantial vertical length of said *radially expanded* valve box lower end with at least two diametrically opposed points on a circumference of said outer surface contacting said valve box simultaneously.

6. A valve box stabilizer for stabilizing a valve box covering an underground valve housing having a valve body and a valve extending vertically from said valve body, and wherein the valve box includes a *radially expanded* tubular lower end for receiving the valve neck, said valve box stabilizer comprising, a hollow body for receiving said valve neck and for being received within said *radially expanded* valve box lower end, said stabilizer having a wall portion with an inner surface for contact with at least a portion of said valve neck along a substantial vertical length of said valve neck, said wall portion also having at least one outer surface fitting within said *radially expanded* valve box lower end and contacting a portion of said *radially expanded valve box* lower end along a substantial vertical length of said *radially expanded* valve box lower end, and said wall portion comprising a plurality of radial fins for simultaneous contact with said valve box.

* * * * *